United States Patent [19]

Kalsi

[11] Patent Number: 5,479,145
[45] Date of Patent: Dec. 26, 1995

[54] SUPERCONDUCTING ELECTROMAGNET FOR LEVITATION AND PROPULSION OF A MAGLEV VEHICLE

[75] Inventor: Swarn S. Kalsi, Fort Salonga, N.Y.

[73] Assignee: Northrop Grumman Corporation, Los Angeles, Calif.

[21] Appl. No.: 303,441

[22] Filed: Sep. 9, 1994

Related U.S. Application Data

[63] Continuation of Ser. No. 115,448, Sep. 1, 1993, abandoned.

[51] Int. Cl.⁶ ............................ H01F 3/00; H01F 1/00; H02K 41/00; B60L 13/02
[52] U.S. Cl. ............................ 335/297; 335/216; 310/14; 104/285; 104/286
[58] Field of Search ............................ 104/281, 282, 104/283, 284, 285, 286; 335/296, 216, 297; 310/90.5, 12, 14

[56] References Cited

U.S. PATENT DOCUMENTS

| | | | |
|---|---|---|---|
| 3,834,318 | 9/1974 | Fellows | 104/148 MS |
| 3,836,799 | 9/1974 | Eastham | 310/13 |
| 3,851,594 | 12/1974 | Schwarzler | 104/148 MS |
| 3,954,064 | 5/1976 | Minovitch | 104/138 R |
| 4,273,054 | 6/1981 | Yamashita | 104/281 |
| 4,640,005 | 2/1987 | Mine | 29/599 |
| 4,646,651 | 3/1987 | Yamamura | 104/281 |
| 4,953,470 | 9/1990 | Yamaguchi | 104/282 |
| 5,094,173 | 3/1992 | Tada | 104/282 |
| 5,222,437 | 6/1993 | Shibata | 104/282 |

FOREIGN PATENT DOCUMENTS 0255404  10/1989  Japan ............................ 104/281

*Primary Examiner*—Leo P. Picard
*Assistant Examiner*—Stephen T. Ryan
*Attorney, Agent, or Firm*—Terry J. Anderson; Karl J. Hoch, Jr.

[57] ABSTRACT

A superconducting electromagnet for levitation and propulsion of a maglev vehicle running against a rail has a magnetic core having a number of salient poles extending from a surface thereof, thereby forming gaps between adjacent ones of the poles, and facing and in operative proximity with the rail. An excitation coil surrounds each pole and is positioned in the gaps on each side of the pole. A cryostat accommodates the excitation coil and is positioned in the gaps between the conducting coil and the core. A control coil surrounds each pole and is positioned in the gaps on each side of the pole for responding to fast disturbances of short duration with a transient current.

22 Claims, 4 Drawing Sheets

SUPERCONDUCTING ELECTROMAGNET FOR LEVITATION AND PROPULSION OF A MAGLEV VEHICLE

CROSS-REFERENCE TO RELATED APPLICATION

This is a continuation of my U.S. patent application Ser. No. 08/115,448, filed Sep. 1, 1993, and now abandoned.

BACKGROUND OF THE INVENTION

Field of the Invention

The present invention relates to a superconducting electromagnet. More particularly, the invention relates to a superconducting electromagnet for levitation and propulsion of a maglev vehicle running against a magnetic rail.

C-shaped electromagnets with a superconducting coil around the back of an iron C-core have been developed for magnetically levitated (maglev) vehicles. A major drawback of the C-core magnets is that they generate an excessive amount of leakage flux which does not do useful work, but saturates the iron core. As a result, the performance of the magnet is significantly degraded.

The principal object of the invention is to provide a superconducting electromagnet which overcomes the disadvantages of the C-shaped electromagnets.

An object of the invention is to provide a superconducting electromagnet of simple structure which functions efficiently, effectively and reliably.

Another object of the invention is to provide a superconducting electromagnet which eliminates limits on useful flux density.

Still another object of the invention is to provide a superconducting electromagnet having a minimum leakage field.

Yet another object of the invention is to provide a superconducting electromagnet for a maglev vehicle in which the superconducting electromagnet overcomes the disadvantages of the C-shaped electromagnets.

Another object of the invention is to provide a superconducting electromagnet for a maglev vehicle which is of simple structure and functions efficiently, effectively and reliably and enhances useful flux density.

Still another object of the invention is to provide a superconducting electromagnet for a maglev vehicle which has a minimum leakage field.

Yet another object of the invention is to provide a superconducting electromagnet for a maglev vehicle which has a greatly reduced leakage field.

Another object of the invention is to provide a superconducting electromagnet for a maglev vehicle which may utilize either low temperature superconductors (LTS) or high temperature superconductors (HTS) as its excitation coil.

Still another object of the invention is to provide a superconducting electromagnet for a maglev vehicle which may utilize LTS of niobium-titanium, niobium-tin, or other materials which operate at, or close to, 4.2 degrees Kelvin of liquid helium.

Yet another object of the invention is to provide a superconducting electromagnet for a maglev vehicle which electromagnet may utilize HTS of bismuth, thalium, or some other based materials which operate at temperatures considerably higher than 4.2 degrees Kelvin and preferably at a temperature of 77 degrees Kelvin of liquid nitrogen.

BRIEF SUMMARY OF THE INVENTION

In accordance with the invention, individual C-core magnet assemblies of the prior art are replaced by a continuous core having a plurality of poles and excitation coils are placed around each pole.

In accordance with the invention, an electromagnet comprises a magnetic core having a plurality of salient poles extending from a surface thereof, thereby forming gaps between adjacent poles. An excitation coil surrounds each pole and is positioned in the gaps on each side of the pole.

The coil is a superconducting coil. Cryostat wall is accommodated in the gaps between the coil and the core. A control coil surrounds each pole and is positioned in the gaps on each side of the pole for responding to fast disturbances of short duration with a transient current.

In accordance with the invention, an electromagnet for levitation and propulsion of a maglev vehicle running against a magnetic rail comprises a magnetic core having a plurality of salient poles extending from a surface thereof, thereby forming gaps between adjacent poles, and facing and in operative proximity with the magnetic rail. An excitation coil surrounds each pole and is positioned in the gaps on each side of the pole.

The rail is slotted in a surface facing the core. These slots carry winding for propelling the vehicle.

In accordance with the invention, a superconducting electromagnet for levitation and propulsion of a maglev vehicle running against a rail comprises a magnetic core having a plurality of salient poles extending from a surface thereof, thereby forming gaps between adjacent poles, and facing and in operative proximity with the rail. An excitation coil surrounds each pole and is positioned in the gaps on each side of the pole. Cryostat wall accommodates the excitation coil and is positioned in the gaps between the conducting coil and the core. A control coil surrounds each pole and is positioned in the gaps on each side of the pole for responding to fast disturbances of short duration with a transient current.

The excitation coil may comprise a low temperature superconductor, or a high temperature superconductor. Magnet shims are provided on the sides of the salient poles of the magnetic core for controlling the lateral stabilization of the magnetic core relative to the width of the rail.

The excitation coil comprises either one of niobium-titanium and niobium-tin, bismuth, thalium, or some new based material.

BRIEF DESCRIPTION OF THE DRAWINGS

Other objects and features of the present invention will become apparent from the following detailed description considered in connection with the accompanying drawings which disclose an embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENT

Figure 1:
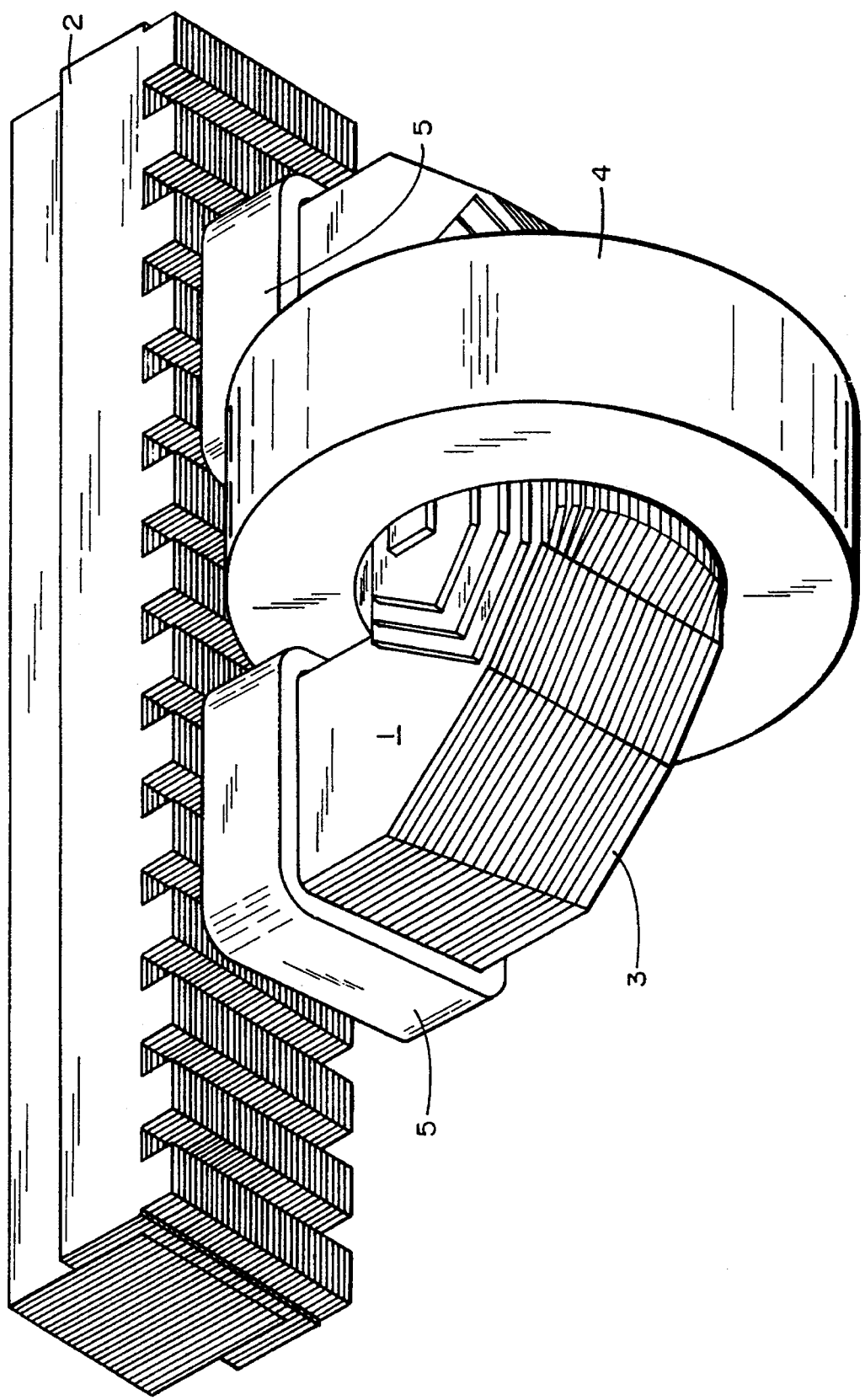
FIG. 1 is a perspective view of a C-core electromagnet of the prior art in an electromagnetic suspension (EMS) magnet system.

FIG. 1 illustrates part of a maglev system of the prior art in which the attraction between an electromagnet 1 and a magnetic rail 2 is utilized to levitate and propel a vehicle (not shown in the FIGS.) The rail 2 may comprise laminated iron and the electromagnet 1 has a laminated iron C-core 3, a superconducting excitation coil 4 and two control coils 5. The superconducting excitation coil 4 surrounds the back of the C-core 3 and preferably comprises niobium-titanium with its cryostat of any suitable known type.

Figure 2:
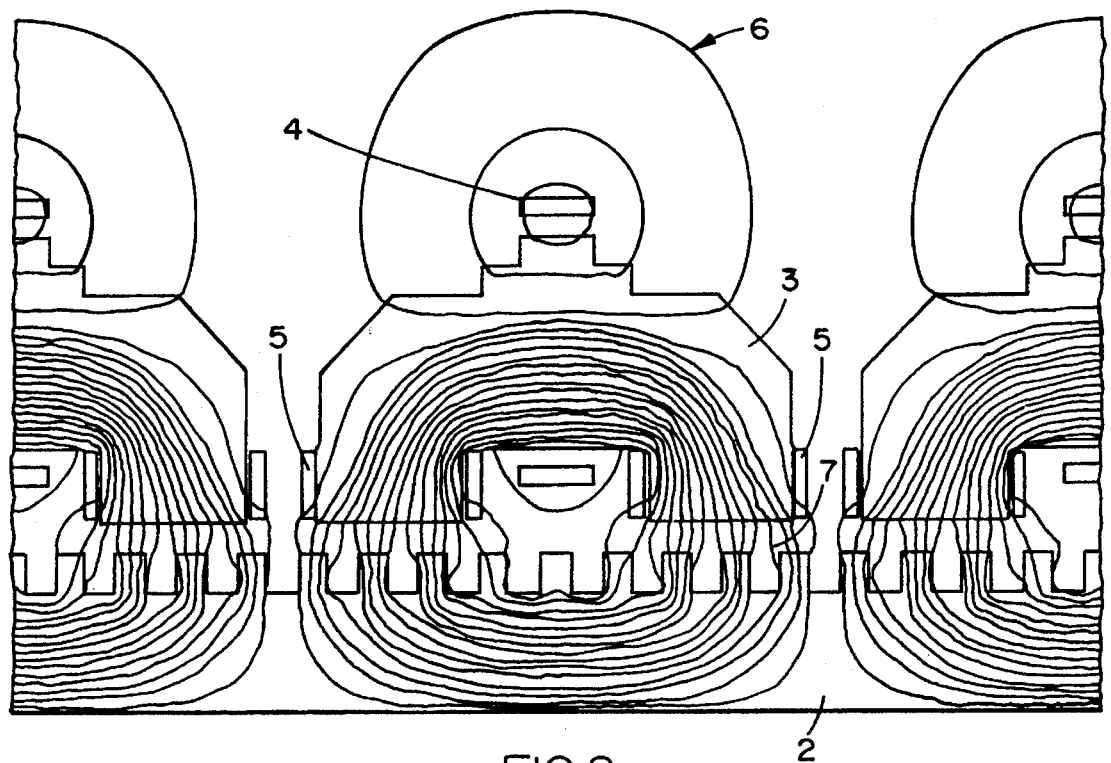
FIG. 2 is a field plot of the EMS magnet system of FIG. 1.

The major shortcoming of the prior art embodiment of FIG. 1 is the excessive leakage field 6, shown in FIG. 2, which does not link the rail. The magnetic field cannot perform useful functions of levitation and propulsion for the vehicle unless said field can link with the rail. The leakage field saturates the core 3 and thus limits the useful flux density that can be attained in the air gap 7.

Figure 3:
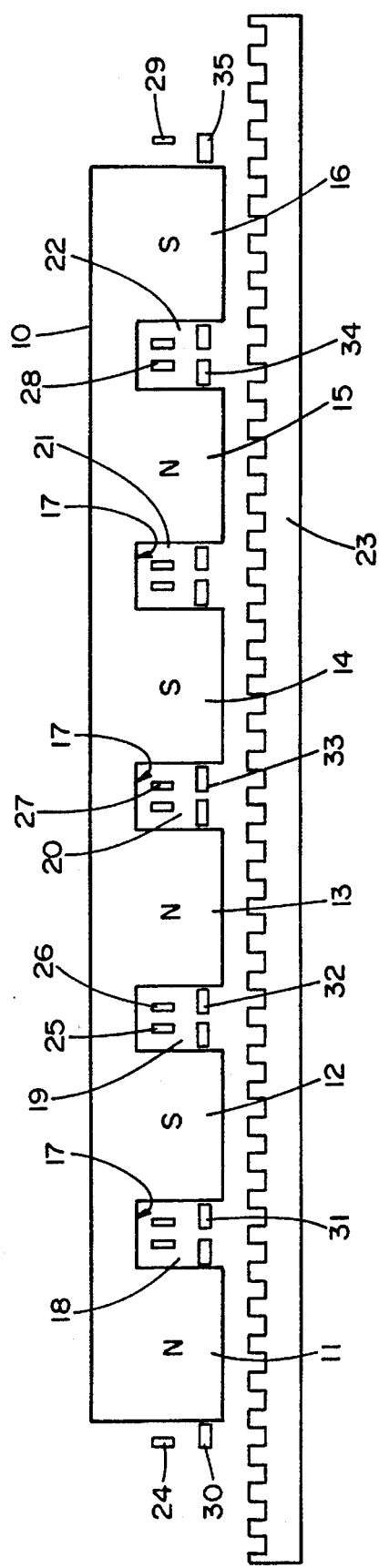
FIG. 3 is a schematic side view diagram of an embodiment of the superconducting electromagnet of the invention for levitation and propulsion of a maglev vehicle running against a rail.

The superconducting electromagnet of the invention, shown in FIG. 3, overcomes the problem of magnetic field leakage of the electromagnet of the prior art shown in FIGS. 1 and 2. FIG. 3 shows the superconducting electromagnet of the invention for levitation and propulsion of a maglev vehicle running on a rail. The electromagnet of the invention has a magnetic core 10 having a plurality of salient poles 11, 12, 13, 14, 15 and 16 extending from a surface 17 thereof, thereby forming gaps 18, 19, 20, 21 and 22 between adjacent ones of said poles.

The poles 11 to 16 may comprise any suitable number, although six are shown in the illustrated embodiment of FIG. 3. The core 10 comprises iron laminations for AC application. The poles 11 to 16 face, and are in operative proximity with, a slotted rail 23, which is magnetic and preferably of iron laminations.

An excitation coil surrounds each pole 11 to 16, respectively, and is positioned in the gaps on each side of said pole. Thus, as shown in FIG. 3, an excitation coil 24 surrounds the pole 11 and is positioned in the gap 18 and outside the core 10, an excitation coil 25 surrounds the pole 12 and is positioned in the gaps 18 and 19 on each side of said pole, an excitation coil 26 surrounds the pole 13 and is positioned in the gaps 19 and 20 on each side of said pole, an excitation coil 27 surrounds the pole 14 and is positioned in the gaps 20 and 21 on each side of said pole, an excitation coil 28 surrounds the pole 15 and is positioned in the gaps 21 and 22 on each side of said pole and an excitation coil 29 surrounds the pole 16 and is positioned in the gap 22 and outside said core.

The excitation coils 24 to 29 produce alternate North and South poles, as shown in FIG. 3, and provide the steady state field excitation for levitation and propulsion functions by being excited with a steady state direct current.

A control coil surrounds each pole 11 to 16, respectively, and is positioned in the gaps on each side of the pole for responding to fast disturbances of short duration with a transient current. Thus, as shown in FIG. 3, a control coil 30 surrounds the pole 11 and is positioned in the gap 18 and outside the core 10, a control coil 31 surrounds the pole 12 and is positioned in the gaps 18 and 19 on each side of said pole, a control coil 32 surrounds the pole 13 and is positioned in the gaps 19 and 20 on each side of said pole, a control coil 33 surrounds the pole 14 and is positioned in the gaps 20 and 21 on each side of said pole, a control coil 34 surrounds the pole 15 and is positioned in the gaps 21 and 22 on each side of said pole and a control coil 35 surrounds the pole 16 and is positioned in the gap 22 and outside said core.

Figure 4:
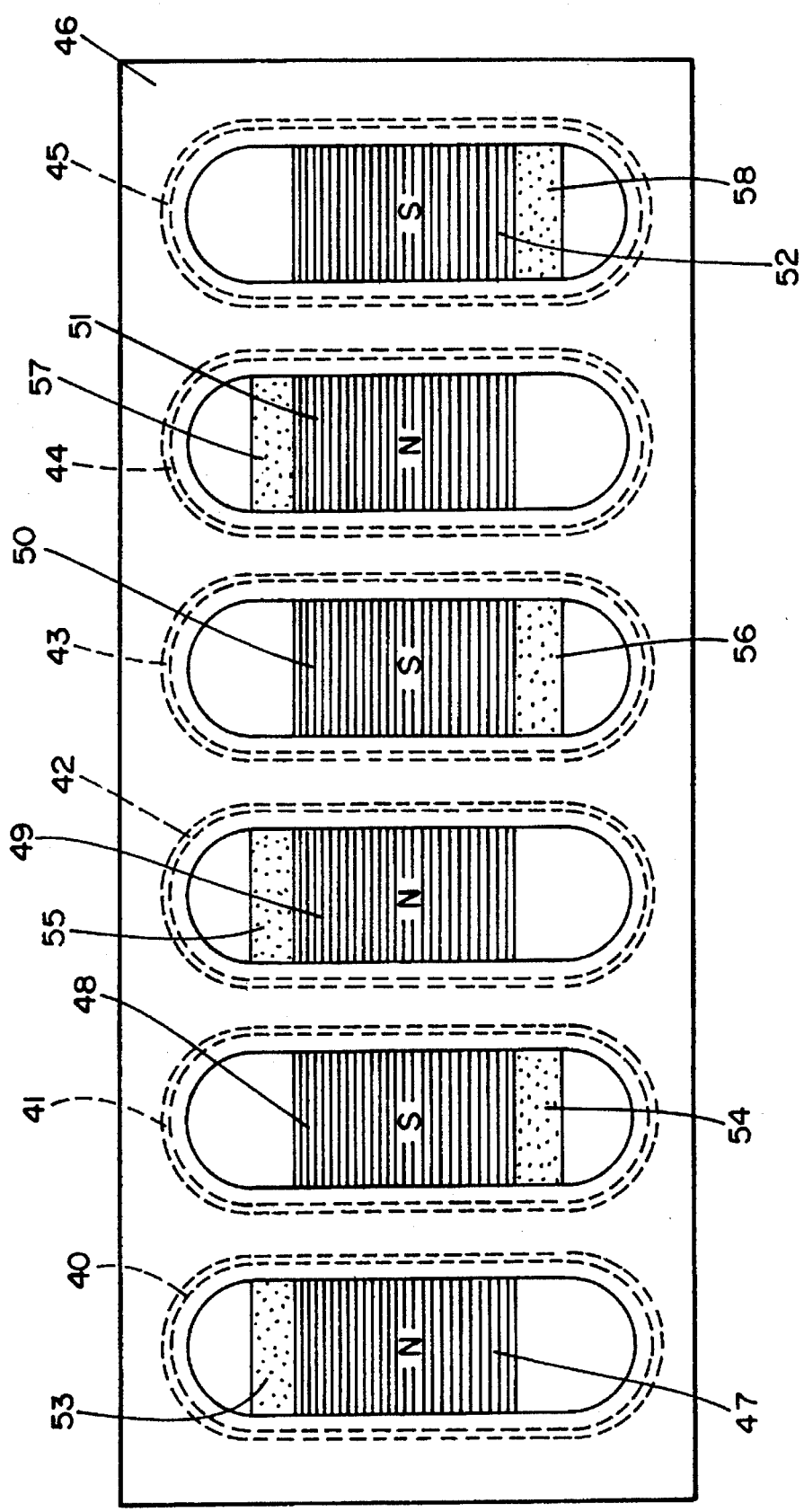
FIG. 4 is a schematic bottom plan view, partly in section, on an enlarged scale, of a modification of the embodiment of FIG. 3.

Cryostat apparatus accommodates the excitation coils and is positioned in the gaps between the conducting coils and the core. FIG. 3 shows only the superconducting winding portions of the superconducting coils. There is sufficient space in FIG. 3 for a cryostat between the superconducting coils 24 to 29 and the core 10. The superconducting winding may comprise niobium-titanium (NbTi), niobium-tin ($Nb_3Sn$), or other LTS for operation around 4.2 degrees Kelvin liquid helium. It is also possible to utilize HTS for operation above 4.2 degrees Kelvin liquid nitrogen, preferably 77 degrees Kelvin, or higher. FIG. 4 shows a modification of the embodiment of FIG. 3 wherein a plurality of superconducting coils 40 to 45 are accommodated by a single cryostat 46. The superconducting coils 40 to 45 surround poles 47 to 52, respectively.

In the modification of FIG. 4, all the superconducting coils 40 to 45 are enclosed in a single cryostat. The coils 40 to 45 are of racetrack configuration in order to minimize the strain in the superconducting wire. The current-carrying capacity of $Nb_3Sn$ and HTS deteriorates significantly with strain.

Another feature of the modification of FIG. 4 is that it provides lateral position control of the salient poles 47 to 52 of the magnetic core or levitation magnets relative to the width of the rail 23 (not shown in FIG. 4). This is accomplished by magnetic shims 53 to 58 on the sides of the salient poles 47 to 52, respectively. Thus, as shown in FIG. 4, a magnetic shim 53 is placed on the side of the pole 47, a magnetic shim 54 is placed on the side of the pole 48, a magnetic shim 55 is placed on the side of the pole 49, a magnetic shim 56 is placed on the side of the pole 50, a magnetic shim 57 is placed on the side of the pole 51 and a magnetic shim 58 is placed on the side of the pole 52. The shims 53 to 58 are placed on opposite sides of next-adjacent ones of the poles, as shown in FIG. 4.

Figure 5:
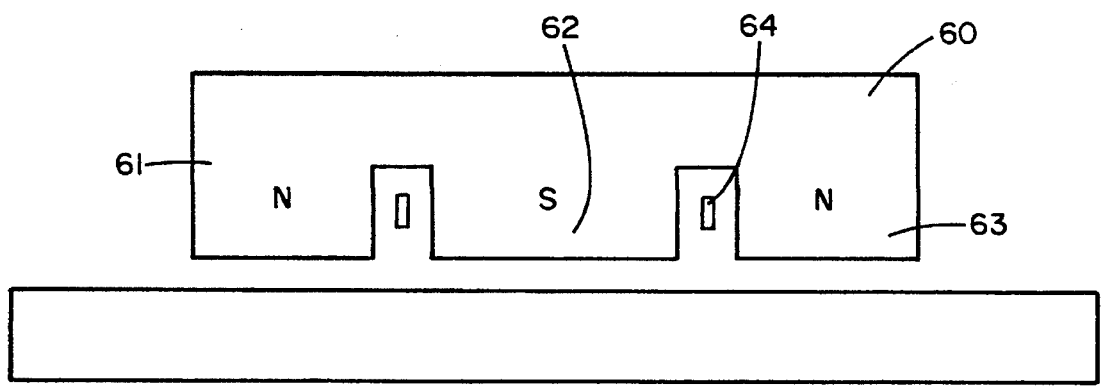
FIG. 5 is a schematic side view diagram of another modification of the embodiment of FIG. 3.

FIG. 5 is a modification of FIG. 3 in which a magnetic core 60 has three poles 61, 62 and 63 and a single coil 64 surrounds the central pole 62. The coil 64 could be normally conducting or superconducting.

While several embodiments of the present invention have been shown and described, it is to be understood that many changes and modifications may be made thereunto without departing from the spirit and scope of the invention as defined in the appended claims.

What is claimed is:

1. A superconducting electromagnet for levitation and propulsion of a maglev vehicle running against a rail, comprising:

a. a magnetic core comprising a continuous magnetic core having a plurality of three or more salient poles extending from a surface thereof, thereby forming gaps between adjacent ones of said poles, and facing and in operative proximity with said rail;

b. a superconducting excitation coil surrounding each of said three or more salient extending poles and positioned in each gap on the side of the pole it surrounds for providing substantially steady state field excitation;

c. a single cryostat means enclosing each of said three or more superconducting excitation coils and also positioned around said three or more salient extending poles of the magnetic core; and d. a control coil surrounding each of said three or more salient extending poles and positioned in each gap on the side of the pole it surrounds for responding to disturbances of short duration with a transient field.

2. A superconducting electromagnet as claimed in claim 1, further comprising passive magnet shims positioned on opposite sides of next-adjacent salient extending poles of said magnetic core for controlling the lateral position of said magnetic core relative to said rail.

3. A superconducting electromagnet as claimed in claim 1, wherein each control coil is positioned between a superconducting excitation coil and the rail.

4. A superconducting electromagnet as claimed in claim 1, wherein the rail comprises a laminated rail.

5. A superconducting electromagnet as claimed in claim 1, wherein the rail comprises a rail having slots in a surface facing the magnetic core, and windings for propelling the maglev vehicle are carried in the slots.

6. A superconducting electromagnet as claimed in claim 1, wherein each superconducting excitation coil comprises a low-temperature superconductor.

7. A superconducting electromagnet as claimed in claim 6, wherein each superconducting excitation coil is made from a material selected from a group consisting of niobium-titanium and niobium-tin.

8. A superconducting electromagnet as claimed in claim 1, wherein each superconducting excitation coil comprises a high-temperature superconductor.

9. A superconducting electromagnet as claimed in claim 8, wherein each superconducting excitation coil is made from a material selected from a group consisting of bismuth and thalium.

10. A superconducting electromagnet as claimed in claim 2, wherein each control coil is positioned between a superconducting excitation coil and the rail.

11. A superconducting electromagnet as claimed in claim 2, wherein the rail comprises a laminated rail.

12. A superconducting electromagnet as claimed in claim 11, wherein the rail comprises a rail having slots in a surface facing the magnetic core, and windings for propelling the maglev vehicle are carried in the slots.

13. A superconducting electromagnet as claimed in claim 3, wherein the rail comprises a laminated rail.

14. A superconducting electromagnet as claimed in claim 13, wherein the rail comprises a rail having slots in a surface facing the magnetic core, and windings for propelling the maglev vehicle are carried in the slots.

15. A superconducting electromagnet as claimed in claim 2, wherein each superconducting excitation coil comprises a low-temperature superconductor.

16. A superconducting electromagnet as claimed in claim 15, wherein each superconducting excitation coil is made from a material selected from a group consisting of niobium-titanium and niobium-tin.

17. A superconducting electromagnet as claimed in claim 13, wherein each superconducting excitation coil comprises a low-temperature superconductor.

18. A superconducting electromagnet as claimed in claim 17, wherein each superconducting excitation coil is made from a material selected from a group consisting of niobium-titanium and niobium-tin.

19. A superconducting electromagnet as claimed in claim 2, wherein each superconducting excitation coil comprises a high-temperature superconductor.

20. A superconducting electromagnet as claimed in claim 19, wherein each superconducting excitation coil is made from a material selected from a group consisting of bismuth and thalium.

21. A superconducting electromagnet as claimed in claim 3, wherein each superconducting excitation coil comprises a high-temperature superconductor.

22. A superconducting electromagnet as claimed in claim 21, wherein each superconducting excitation coil is made from a material selected from a group consisting of bismuth and thalium.

* * * * *